United States Patent [19]
Wistuba et al.

[11] 4,324,091
[45] Apr. 13, 1982

[54] VEHICULAR FORAGE HARVESTER

[75] Inventors: Eberhard Wistuba, Rettenbach; Xaver Lenzer, Kleinkötz; Herbert Mändle, Kleinanhausen, all of Fed. Rep. of Germany

[73] Assignee: Karl Mengele & Söhne Maschinenfabrik and Eisengiesserei GmbH & Co., Günzburg, Fed. Rep. of Germany

[21] Appl. No.: 970,238

[22] Filed: Dec. 18, 1978

[30] Foreign Application Priority Data

Dec. 19, 1977 [DE] Fed. Rep. of Germany ....... 2756539

[51] Int. Cl.³ .................... A01D 43/06; A01D 87/10
[52] U.S. Cl. .................... 56/16.6; 56/13.3; 56/344; 406/41; 414/335
[58] Field of Search .............. 414/335; 406/159, 160, 406/161, 164, 165, 166, 39, 41, 196; 56/16.6, 13.3, 344

[56] References Cited

U.S. PATENT DOCUMENTS

| 2,496,472 | 2/1950 | Huddle | 406/41 |
| 2,778,510 | 1/1957 | Maxhill et al. | 406/39 |
| 2,955,403 | 10/1960 | McKee | 56/13.3 |
| 2,972,848 | 2/1961 | McKee | 56/13.3 |
| 3,289,864 | 12/1966 | Hochmuth | 414/335 |
| 3,496,977 | 2/1970 | Gifford | 56/16.6 |

Primary Examiner—Paul J. Hirsch
Attorney, Agent, or Firm—Toren, McGeady and Stanger

[57] ABSTRACT

A vehicular forage harvester has a trailer wagon pivotally connected thereto with a chute operating to deliver an agricultural crop cut by the forage harvester into the trailer wagon. The chute includes a flexible section which enables the discharge end of the chute to be maintained in a position to deposit the crop into the trailer wagon when the wagon is pivotally moved relative to the forage vehicle.

7 Claims, 2 Drawing Figures

VEHICULAR FORAGE HARVESTER

BACKGROUND OF THE INVENTION

The present invention relates generally to agricultural vehicles and more particularly to a vehicular forage harvester.

Forage harvesters usually comprise three essential principal components which include the cutting or pickup apparatus, a chopping device and, connected thereto, a discharge tube or crop chute which may have a baffle plate or crop deflector connected at its end which may be swung vertically, with a harvest vehicle being connected through a draw bar by means of a provided hitching device.

In agricultural vehicles of the type described, a transport or harvest vehicle may have a forage harvester operatively connected thereto or a drive unit may be connected to the forage harvester. In such vehicles, problems may arise during travel of the vehicle around a curved path. Particularly, during turning of the vehicle on a field or operating site, the crop chute of the forest harvester is to be guided in accordance with the swinging movements of the vehicular elements so that the cut material may be conveyed from the forage harvester into a wagon which may be connected thereto or a drive unit may be connected The cut material must be deposited into the trailer wagon despite pivotal relative motion between the wagon body and the vehicle in order to insure that the wagon is evenly loaded.

Guidance of the crop chute under such circumstances will require the permanent attention of the driver and will depend upon the skill of the driver. Because of the fact that the driver may be required to perform other necessary tasks, it may frequently occur that harvested material is lost because the crop chute is not readjusted at the appropriate time during turning operation.

The invention is directed toward the task of providing a device by means of which the crop chute may be automatically maintained in its adjusted position relative to the forage harvester during all swinging or pivotal movements of the harvest vehicle thereby relieving the driver from the task of maintaining appropriate orientation of the discharge end of the chute during turning. This will enable the driver to perform other tasks and will insure recovery of the harvested material without undue losses thereof.

SUMMARY OF THE INVENTION

Briefly, the present invention may be described as an agricultural vehicular assembly comprising a forage harvester including means for cutting an agricultural crop, vehicle means having the forage harvester operably mounted therewith, wagon means for receiving the crop from the forage harvester, hitching means pivotally connecting the wagon means with the vehicle means in driving relationship therewith, chute means for delivering the crop from the harvester, the chute means including a discharge end for depositing the crop into the wagon means, with the chute means being provided with a flexible chute section connected as part of the chute means. In accordance with the invention, swivel means are provided having the flexible chute section mounted thereon to effect bending of the flexible chute section in response to pivotal motion between the vehicle means and the wagon means thereby to maintain the discharge end of the chute means directed into the wagon means when the wagon means and the vehicle means are pivotally turned relative to each other.

The crop chute is thereby constructed with a flexible section in the region above the hitching coupling between the wagon means and the vehicle means. The swivel means comprise a crank bar which is rotatably mounted on the vehicle means having one end of the flexible chute section attached thereto. A crank arm connected with the wagon means operates to rotate the crank bar when the wagon means is pivoted relative to the vehicle means. The one end of the flexible chute section is connected to the crank bar by a connecting rod, with the connecting rod and the crank arm being arranged in approximately the same vertical plane.

As a result of this arrangement, the crank arm operates to sense all swinging movements of the harvest vehicle and, through operation of the coupling arm, corresponding swinging movements and automatic adjustment of the crop chute are achieved.

In a further development of the invention the crank arms are connected to a draw bar of the wagon means through a fork-like member or the like which will compensate for varying vertical positions of the draw bar.

Larger differences in relative vertical movements can be achieved and in a further development of this arrangement the fork-like member is itself constructed so as to be vertically adjustable.

The coupling arms and the flexible section can be connected in a similar manner.

In accordance with the invention, an approximately vertically extending post or column may serve as a stationary support for the crank arm while being simultaneously constructed to serve as a support column for the crop chute. The top and bottom ends of the crank arm are supported in the support column by means of journals arranged in bushings.

In accordance with a further embodiment of the invention the crank can be replaced by an electromechanical resetting device or the like wherein, for example, the positions of the draw bar are sensed by a poled relay, with a motor acting on the flexible section being switched by this relay for rotation in either a clockwise or counterclockwise direction, with the control circuit being closed through a bridge circuit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 2:
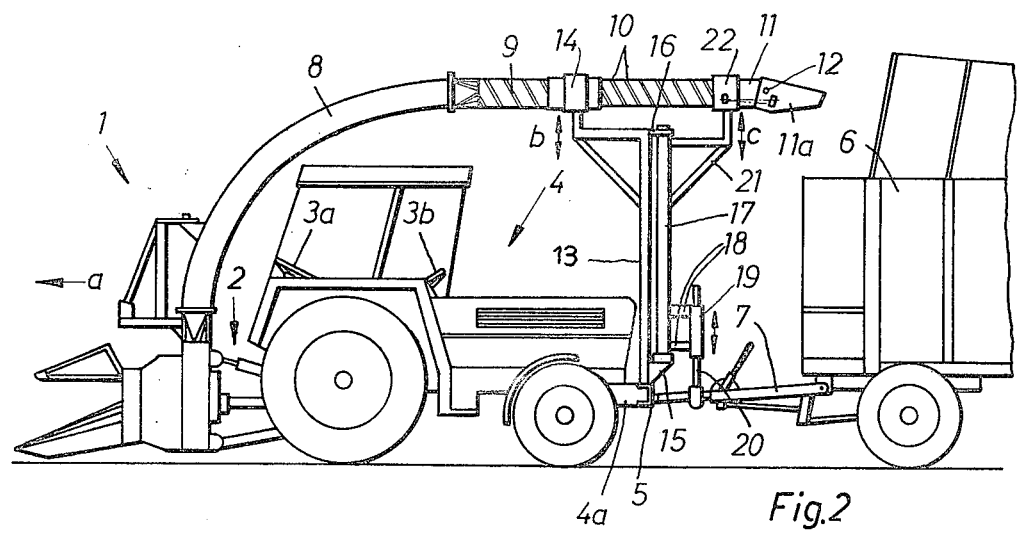
FIG. 2 is a side view of the unit shown in FIG. 1.

Referring now to the drawing, a forage harvester 1 is connected to a hydraulically operated three-point linkage system 2 of a tractor 4. The tractor 4 may be operated for travel in a forward and reverse direction and it is equipped with control and steering elements 3a and 3b for travel in both directions. In the direction of the arrow a of FIG. 2, the tractor 4 is driven by means of the control and steering device 3a, the forage harvester 1 being arranged at the front of the tractor 4. A loading and unloading wagon 6 for receiving chopped or cut crop material is connected to a yoke 5 by means of a draw bar 7, the yoke 5 being located at the front of the tractor when the tractor is driven in a direction toward the right as viewed in FIG. 2.

The forage harvester 1 is provided with a crop chute 8 which is curved and which extends toward the rear of the vehicle. The crop chute 8 includes an extension in the form of a plastic tube 9 which consists of plastic material and which is reinforced by a plastic spiral 10. A rigid tube section 11 with a crop deflector 11a adapted to be swung upwardly and downwardly by means of hinges 12 is connected to the other end of the plastic tube 9.

A flexible chute section 9–11 in accordance with the present invention is supported by a post or column 13 which, at the bottom thereof, is releasably mounted on a tractor frame 4a by means of screws (not shown). At the top of the column 13, the flexible section 9–11 is supported by a sleeve 14 which is mounted on the column 13. At the top and bottom of the column 13 there are provided bearing bushings 15 and 16 at which there is supported a crank bar 17 for swiveled or pivotal motion relative to the column 13. The crank bar 17 is provided at the bottom thereof with a crank arm 18 having a free end at which there is supported a fork member 20 which is vertically adjustable in a guide 19. The fork member 20 connects the crank arm 18 to a draw bar 7 of the wagon 6 in a fixed manner which, however, facilitates vertical adjustment of the draw bar 7. Connected to the other end of the crank bar 17 is a coupling or connecting arm 21 which, in turn, has connected thereto an end of the flexible section 9–11 by means of a sleeve 22. As indicated by arrows b and c, both supports of the crop chute are vertically adjustable.

Figure 1:
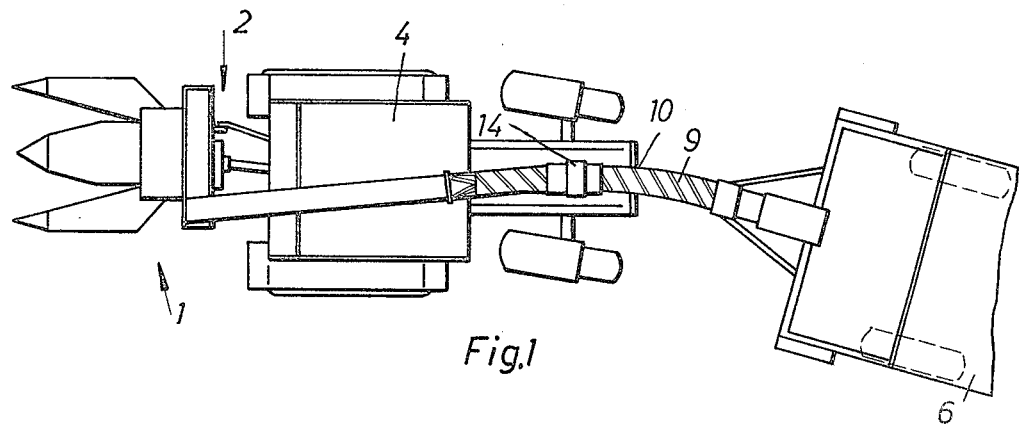
FIG. 1 is a schematic top view showing a vehicular forage harvester unit in an arrangement according to the present invention.

By means of the arrangement described, through the fork member 20 of the crank arm 18, swinging or pivotal movements of the draw bar 7 and, consequently, of the harvest vehicle or trailer wagon 6 are sensed. The end 11, 12 of the crop chute which is held by the sleeve 22 is guided in accordance with this swinging movement through the crank bar 17 and the connecting arm 21. As a result, as will be seen from FIG. 1, the end 11, 12 of the crop chute will always be positioned in the middle or center of the harvest vehicle during all swinging movements so that loading may be carried out uniformly and without losses.

While specific embodiments of the invention have been shown and described in detail to illustrate the application of the inventive principles, it will be understood that the invention may be embodied otherwise without departing from such principles.

What is claimed is:

1. An agricultural vehicular assembly comprising: a forage harvester including means for cutting an agricultural crop; vehicle means having said forage harvester operably mounted therewith; wagon means for receiving said crop from said forage harvester; hitching means pivotally connecting said wagon means with said vehicle means in driving relationship therewith; chute means delivering said crop from said harvester, said chute means including a discharge end for depositing said crop into said wagon means; a flexible chute section connected as part of said chute means; and swivel means having said flexible chute section mounted thereon to effect bending of said flexible chute section in response to pivotal motion between said vehicle means and said wagon means to maintain said discharge end of said chute means directed into said wagon means when said wagon means and said vehicle means turn relative to each other; said flexible chute section including a first and a second end, with said first end being fixed relative to said vehicle means and with said second end being fixed relative to said wagon means, said swivel means and said hitching means being operably associated to effect bending of said flexible chute section simultaneously with relative pivotal motion between said wagon means and said vehicle means.

2. An assembly according to claim 1 wherein said swivel means comprise a crank bar rotatably mounted on said vehicle means having one end of said flexible chute section attached thereto, and a crank arm connected with said wagon means operating to rotate said crank bar when said wagon means is pivoted relative to said vehicle means.

3. An assembly according to claim 2 wherein said one end of said flexible chute section is connected to said crank bar by a connecting arm, said connecting arm and said crank arm being arranged in approximately the same vertical plane.

4. An assembly according to claim 2 wherein said hitching means include a draw bar and wherein said crank arm is connected to said draw bar through a forked member.

5. An assembly according to claim 4 wherein said forked member is arranged at said crank arm so as to be vertically adjustable.

6. An assembly according to claim 4 wherein said one end of said flexible chute section is connected to said crank bar by a connecting arm and wherein said connecting arm is arranged on said crank bar to be vertically adjustable.

7. An assembly according to claim 2 comprising an approximately vertical support column serving as a stationary support for said crank bar and for said crop chute, said crank bar being supported at the top and bottom of said support column by means of journaled bushings.

* * * * *